United States Patent [19]
Burdisso et al.

[11] Patent Number: 6,112,514
[45] Date of Patent: Sep. 5, 2000

[54] FAN NOISE REDUCTION FROM TURBOFAN ENGINES USING ADAPTIVE HERSCHEL-QUINCKE TUBES

[75] Inventors: Ricardo A. Burdisso; Jerome P. Smith, both of Blacksburg, Va.

[73] Assignee: Virginia Tech Intellectual Properties, Inc., Blacksburg, Va.

[21] Appl. No.: 09/159,634

[22] Filed: Sep. 24, 1998

Related U.S. Application Data

[60] Provisional application No. 60/064,316, Nov. 5, 1997.

[51] Int. Cl.[7] ................................................. F02K 3/02
[52] U.S. Cl. ........................... 60/226.1; 181/250; 181/213
[58] Field of Search ......................... 417/226.1, 39.33; 181/213, 214, 250

[56] References Cited

U.S. PATENT DOCUMENTS

| | | | |
|---|---|---|---|
| 3,951,566 | 4/1976 | Mattei et al. | 415/115 |
| 4,199,295 | 4/1980 | Raffy et al. | 60/226.1 |
| 4,255,083 | 3/1981 | Andre et al. | 60/226.1 |
| 5,033,581 | 7/1991 | Feuling . | |
| 5,732,547 | 3/1998 | Olsen et al. | 60/226.1 |
| 5,952,621 | 4/1980 | Curtis et al. | 181/213 |

*Primary Examiner*—Charles G. Freay
*Attorney, Agent, or Firm*—Whitham, Curtis & Whitham

[57] ABSTRACT

An array of adaptive or fixed Herschel-Quincke tubes aligned in a circumferential or helical array about an inlet of a turbofan engine. The array of tubes effectively divide the acoustic energy generated by the engine. One of the energy components propagates within the tubes while the other propagates within the engine compartment. At some time certain, the acoustic energy in the tubes is reintroduced into the engine compartment to cancel the acoustic energy remaining in the engine as it propagates from the fan towards the inlet and outlet openings.

25 Claims, 9 Drawing Sheets

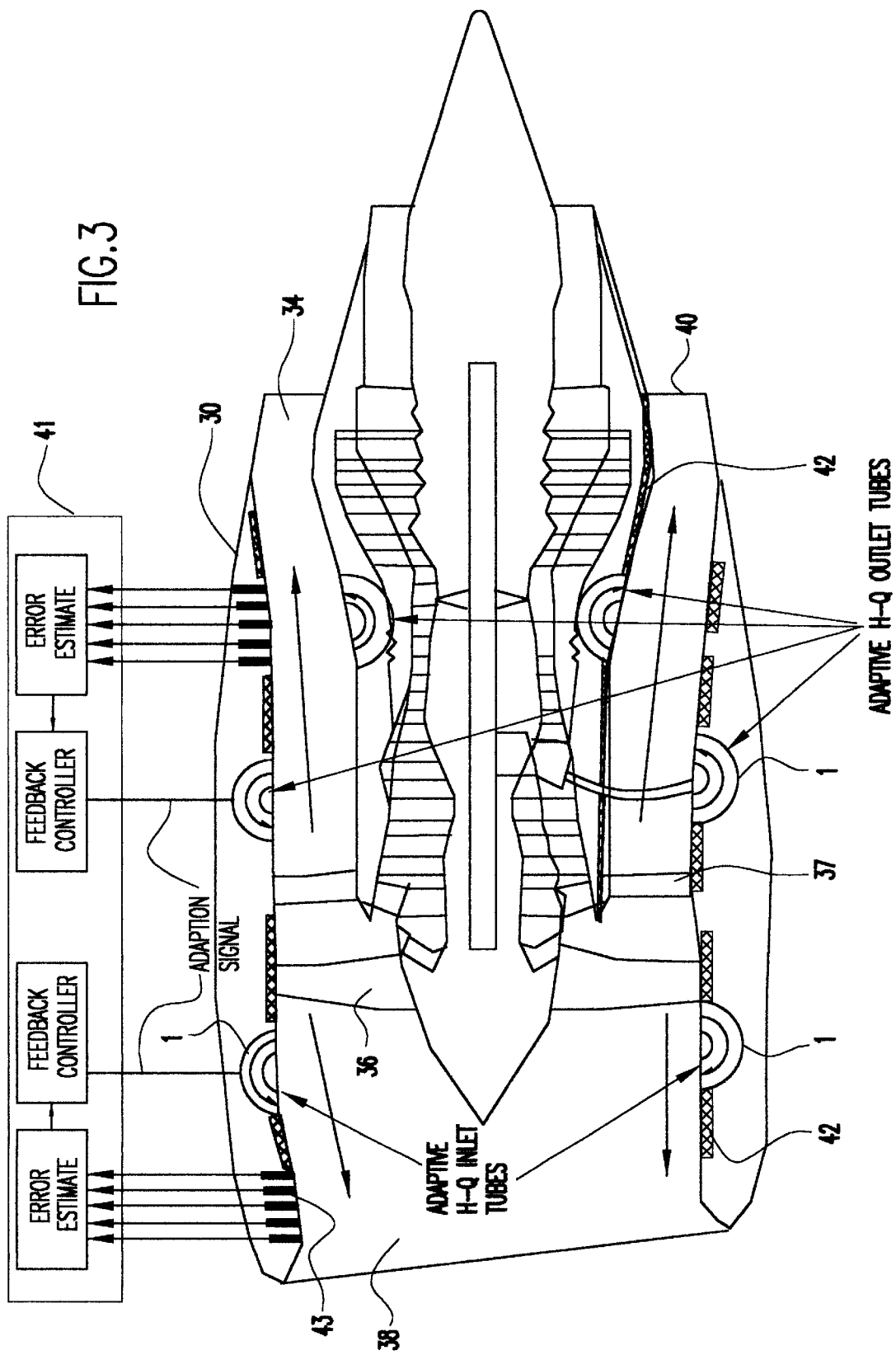

FAN NOISE REDUCTION FROM TURBOFAN ENGINES USING ADAPTIVE HERSCHEL-QUINCKE TUBES

This application claims benefit to U.S. Provisional 60/064,316 filed Nov. 5, 1997.

BACKGROUND OF THE INVENTION

1. Field of the Invention

The invention generally relates to a noise reduction system for reducing noise energy generated by a noise generating system, and more particularly, to an adaptive noise reduction system that reduces acoustic energy generated by turbofans used in, for example, jet engines.

2. Description of the Prior Art

Current turbofan jet engines that radiate high noise levels are increasingly under scrutiny by the federal government, and more specifically by the Federal Aviation Administration (FAA), due to increased community concern over the problem of noise pollution. In fact, the FAA has pressured aircraft operators to substantially reduce these noise levels by implementing new regulations (e.g., FAR 36 Stage 3 requirements and future more stringent requirements) which must be complied with by the year 2000.

These new regulations pose a serious problem for aircraft operators, such as, for example, shipping, passenger and military operators, since current noise reduction technology cannot meet many of these new requirements. Also, some technology that can meet the current requirements, only do so at great expense by requiring massive retrofits and reconfiguration of the engine compartment, and in some instances, the aircraft itself These same technologies also increase the weight of the plane which, in turn, reduces fuel efficiency. Thus, because of the expense and other factors associated with meeting the strict FAA guidelines, a significant number of aircraft currently in use will not meet the FAA requirements and will have to be removed from service.

There are currently two available alternative technologies for reducing inlet noise in jet engines. One technology simply employs "liners" on the engine compartment which are internal coatings that absorb acoustic energy at the engine inlet. This technology is very limited in that it does not reduce noise over a large frequency range, but is mainly limited to broadband noise. Also, liners become ineffective with time because of changes in material properties due to accumulation of dirt, dust and liquids in the absorptive material. Also, the sound reduction obtained from liners is limited since the amount of reduction is directly proportional to the amount of surface treatment. Thus, if an operator wants to greatly reduce the noise using the liner, the operator must use more liner material over a larger surface area. This adds to the weight of the aircraft and thus affects the fuel consumption of the aircraft.

Technologies for reducing noise also include active noise cancellation systems which are primarily effective at specific frequencies, i.e. tonal noise. To this end, research conducted by Thomas R. J., Burdisso, R. A., Fuller, C. R., O'Brien, W. F., "Active Control of Fan Noise from a Turbofan Engine," AAIA No. 93-0597. 31$^{st}$ Aerospace Sciences Meeting & Exhibit, Jan. 11–14, 1993, pp. 1–9, conclusively demonstrates that the periodic whine of turbofan noise (both primary frequency and first harmonic) from a commercial Pratt and Whitney JT15D-1 engine radiated forward from the inlet can be successfully reduced. However, in any practical application, the heavy and expensive compression type acoustic drivers may not be able to withstand the real environment. Also, in future engines, with lower blade passage frequencies, even larger and heavier electronic drivers would have to be used, and the poor reliability of the moving parts would be a problem in commercial engines. In addition, the electrical power requirement to drive these compression drivers would require a dedicated source of electrical power.

Not only is fan noise a problem in existing aircraft engines, it has also been identified as a major technical concern in the development of the next-generation engines. To this end, with rising fuel costs, more fuel-efficient aircraft engines are now of great interest to engine designers. One such engine currently in development is the ultra-high bypass (UHB) engine. Although attractive from the standpoint of fuel efficiency, a major drawback of these UHB engines is the high noise levels associated with these engines. Not only will the introduction of ultra high bypass ratio engines in the future, with the bypass ratios in the range of 10, result in a greater fan noise component, with shorter inlet ducts relative to the size of the fan and for the lower blade passage frequencies expected for these engines, passive acoustic liners will have greater difficulty contributing to fan noise attenuation because liners are less effective as the frequencies decrease and the acoustic wavelength increases.

It would thus be advantageous to provide a low cost system, that can be used in new engines and also added as a retrofit to existing engines, for reducing both broadband noise and tonal components without having limitations on sound reduction which are imposed by surface treatments such as passive liners. This system would preferably reduce the noise components without affecting the performance of the aircraft.

SUMMARY OF THE INVENTION

It is therefore an object of the present invention to provide a noise reduction system to reduce both broadband and tone fan noise components.

It is another object of the present invention to provide a noise reduction system that reduces noise at both inlet and outlet ports of a noise generating system, and more specifically turbofan engines.

In a preferred embodiment, the invention is directed to the attenuation of inlet and outlet noise from turbofan engines. The present invention utilizes an array of specially designed adaptive or fixed tubes to effectively divide the acoustic energy generated by the engine. One of the energy components propagates within the tubes while the other propagates within the engine compartment. At some time certain, the acoustic energy in the tubes is reintroduced into the engine compartment to cancel the acoustic energy remaining in the engine as it propagates from the fan towards the inlet and outlet openings.

Specifically, the noise reduction system of the present invention comprises means for generating noise energy, where the noise energy propagates through an enclosure having at least an inlet. An array of tubes each having an inlet and an outlet are further provided, where the inlet and the outlet of each tube communicates with the enclosure. The array of tubes is positioned preferably around the enclosure and their properties can be adaptively changed. The enclosure has an effective length $L_2$ between the inlet and the outlet of each of the tubes, while the tubes have a length $L_1$, where $L_1 > L_2$.

In a preferred embodiment, the noise energy divides into two components at the inlet of each of the tubes. A first component of the noise energy propagates through each of the tubes over the length $L_1$ and a second component of the noise energy propagates through the enclosure over the effective length $L_2$ such that when the noise energy exits the outlet of each of the tubes the noise energy is out-of-phase and recombines with the noise energy propagating over the effective length $L_2$. This reduces the noise levels generated from the means for generating noise energy.

In a more preferred embodiment, the means for generating noise energy is a turbofan engine and the enclosure having an effective length $L_2$ refers to portions of the engine compartment. The tubes are preferably placed in a circumferential or helical array about the engine at the fan inlet; however, the tubes may be located at other locations throughout the turbofan engine compartment in order to reduce noise levels. An important advantage of the invention is that the noise field in the tubes has the same distribution as the noise field generated by the fan on the engine compartment surface. Thus, the tube system automatically accounts for any lack of symmetry in the sound field created by the fan.

BRIEF DESCRIPTION OF THE DRAWINGS

The foregoing and other objects, aspects and advantages will be better understood from the following detailed description of the preferred embodiments of the invention with reference to the drawings, in which:

FIG. 3 shows a side view of the multiple arrays of Herschel-Quincke tubes applied to an engine inlet and on both surfaces (inner and outer) of the outlet.

DETAILED DESCRIPTION OF THE PREFERRED EMBODIMENTS OF THE INVENTION

The present invention is directed to a noise reduction system. In a preferred embodiment, the noise reduction system of the present invention is used with turbofan engines; however, other systems, such as, for example, systems that generate noise which propagate in a partially enclosed area, such as air ventilation ducts, are equally contemplated for use with the present invention. Thus, the present invention is not limited to the noise reductions systems for use with turbofan engines, but is equally applicable to the use with other noise generating systems. The dimensions of the noise reduction system of the present invention, including tube length, width, shape and other variables and quantities specified herein may vary depending on the particular application of the present invention. Therefore, numbers and dimensions specified herein are not to be construed as limitations on the scope of the present invention, but are meant to be merely illustrative of one particular application.

For exemplary purposes only, the noise reduction system of the present invention is described with reference to reducing noise in turbofan engines. According to the exemplary embodiment, the noise reduction system of the present invention effectively reduces noise energy over a wide range of frequencies for both tonal and broadband components of the inlet and outlet noise for turbofan engines. Specifically, the noise reduction system of the present invention utilizes at least one array of Herschel-Quincke tubes arranged preferably in a circumferential or helical array about the turbofan engine in order to reduce the noise levels generated by the turbofan engine. The Herschel-Quincke tubes may also be placed at the inlet, and in other locations, such as, for example, in either the upstream or downstream location from the turbofan engine. The inlet and outlet of the tubes can be placed parallel to the engine axis or at an angle. By attaching an array of Herschel-Quincke tubes of appropriate length onto the inlet and/or outlet of the turbofan engine (or other noise generating system), destructive waves are created that cancel the acoustic energy in the turbofan engine, without contributing to any significant aircraft drag or reduced fuel consumption.

Figure 1:
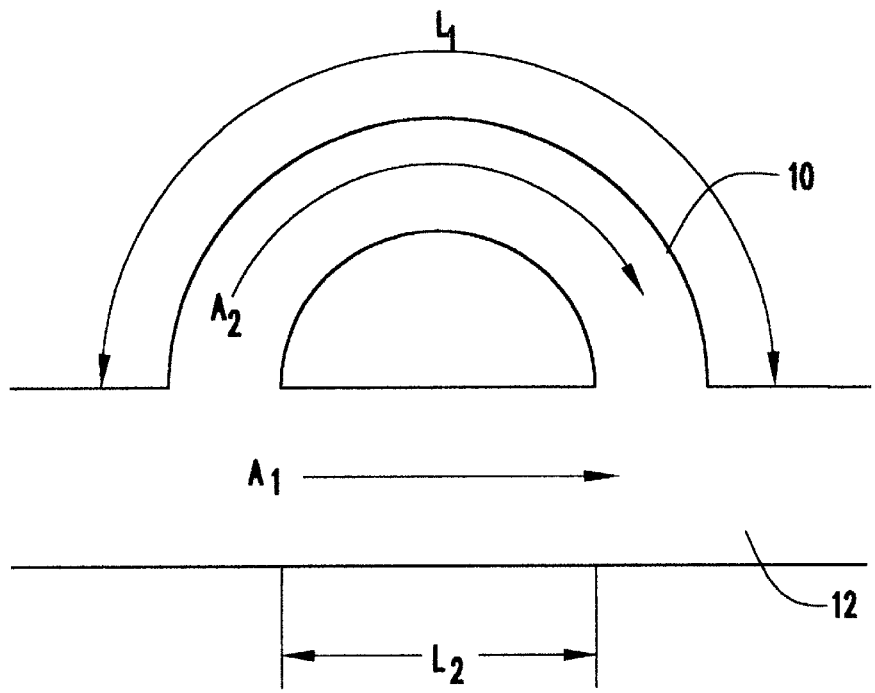
FIG. 1 shows a Herschel-Quincke tube applied to a rigid duct for the case of plane waves propagating in the duct and tube, i.e., the acoustic pressure is uniform at any cross section of the duct and tube.

Referring now to FIG. 1, a single Herschel-Quincke tube applied to a rigid duct for the case of plane waves propagating in the duct and tube is shown. FIG. 1 shows only a single Herschel-Quincke tube which includes a parallel connection of two pipes having different lengths. That is, the Herschel-Quincke tube is a first pipe 10 having a length $L_1$ connected to second pipe 12 having an effective length $L_2$ between an inlet and an outlet of the first pipe 10, where $L_1$ is greater than $L_2$ (e.g., $L_1>L_2$). In embodiments, the cross sectional area of the first pipe 10 and the second pipe 12 may be of different areas, as discussed with reference to FIG. 3. The only limitation imposed on the present invention is that $L_1>L_2$.

Referring still to FIG. 1, in order to reduce the acoustic energy (e.g., noise energy) generated from the noise source, sound generating from the noise source enters the second pipe 12 where it propagates in the second pipe 12 until it reaches the intersection of the second pipe 12 and the first pipe 10. This sound energy is typically uniform sound energy around the surface and within the enclosure. At this juncture, the sound energy is divided into two components, where one component enters and propagates through the first pipe 10 (depicted by the curved arrow) and the other component remains and propagates through the shorter second pipe 12 (depicted as the straight arrow).

The sound propagating through the first pipe 10 is delayed due to the longer propagation path of the first pipe 10 and then recombines with the sound propagating through the second pipe 12. At some frequencies, the sound re-entering the second pipe 12 from the outlet of the first pipe 10 is now out-of-phase and of nearly the same magnitude from the sound propagating through the second pipe 12, thus reducing noise levels in pipe 12. By adjusting the lengths and cross sectional area (or impedance or other variables) of the first pipe 10, the sound propagating through the first pipe 10 cancels the sound in the shorter second pipe 12 throughout a range of frequencies. The adjusting of the parameters of the first pipe 10 can be performed actively by any known control system (e.g., feedfordward, feedback, neural nets, a host of algorithms, etc.) such that the first pipe 10 in combination with the second pipe 12 can eliminate sound energy over a large range of frequencies.

Figure 2:
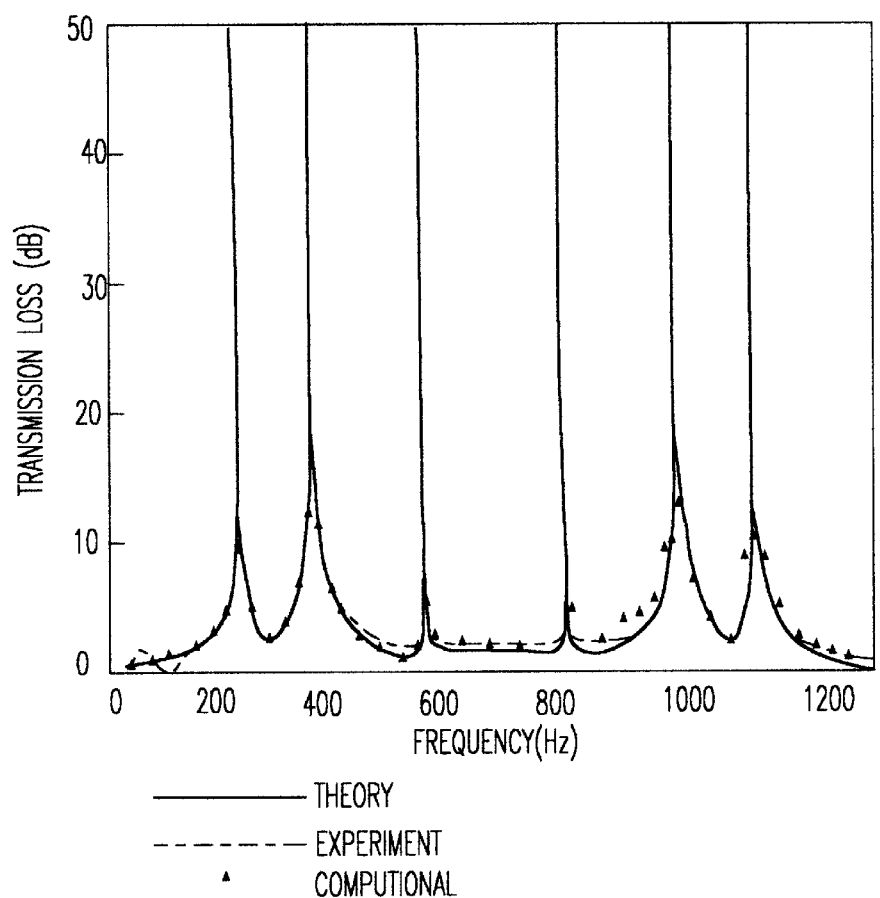
FIG. 2 shows a graph of the transmission loss associated with the Herschel-Quincke tube for the case of plane wave inside the duct and tube.

FIG. 2 shows a graph of the typical transmission loss associated with the Herschel-Quincke tube for the case of a plane wave inside the duct and tube.

FIG. 3 shows a specific embodiment of the noise reduction system of the present invention as it applies to a turbofan engine. FIG. 3 further shows the adaptation of the tube properties to optimize the noise reduction at each operational condition of the engine. However, as previously discussed, the noise reduction system of the present invention works equally well with any other system where the noise propagates through tubes or within other enclosed spaces.

Still referring to FIG. 3, a turbofan engine 30 having an array of tubes 1 aligned about an engine compartment 32 including an air passage system 34 is shown. The turbofan engine 30 has a fan 36 located near a fan inlet 38 and guide vanes 37 located at an entry of the air passage system 34, where the air passage system 34 leads to a fan outlet 40. As is evident, the shorter second pipe 12 of FIG. 1 is depicted as a portion of the engine compartment 30 and air passage system 34 between the respective inlet and outlet ports of each tube of the array of tubes 1. Also, each tube of the array of tubes 1 are independent of one another and are further preferably identical to one another. However, in embodiments, the tubes do not have to be identical to one another for the noise reduction system of the present invention to work in its intended manner.

In the specific embodiment of FIG. 3, the array of tubes 1 are located in the fan inlet 38 and along the air passageway system 34 in a circumferential or helical array. That is, the array of tubes 1 are mounted both upstream (inlet tubes) and downstream (outlet tubes) from the fan 36. The location of the downstream array of tubes 1 results in attenuation of the bypass outlet noise radiation towards the rear of the engine at the fan outlet 40, while the upstream location of the array of tubes 1 results in the attenuation of the noise energy propagating towards and out of the fan inlet 38. Reduction of both the inlet and the outlet noise radiation results in better overall noise reduction. The array of tubes 1 may also be positioned in other locations with equally good sound reduction results.

In preferred embodiments, the array of tubes 1 are embedded within a passive liner treatment 42, and may also be near the fan inlet 38 and outlet 40 of the air passage system 34. This allows a combination of the attenuation effects of the array of tubes 1 with those of the passive liner treatment 42. It is noted with particular reference to FIG. 9 that the area occupied by the array of tubes 1 is only a small fraction of the available surface of the air inlet 38 or of the passage system 34. Thus, the presence of the tubes is not detrimental to the performance of the liner 42.

The noise energy generated by the fan 36 is depicted by the arrows in FIG. 3. Unlike in the case of FIG. 1, the sound field generated by the fan 36 is very complex and it is non-uniform in both the axial and azimuth directions. This noise energy propagates through the fan inlet 38, and also propagates through the air passage system 34. Thus, the noise energy generated by the fan 36 propagates towards the each tube of the array of tubes 1 in both the upstream and downstream positions. As seen by the arrows, a component of the noise energy branches off at the inlet of the each of the tubes of the array of tubes 1 (curved arrows) and the remaining component of the noise energy continues upstream and downstream inside the fan inlet (straight arrow). The sound field inside each of the tubes of the array of tubes 1 in the inlet 38 has the same variation as the sound field on the surface of the inlet 38. The same is the case for the array of tubes 1 on the air passage 34.

The noise energy propagating through each of the tubes of the array of tubes 1 has a longer propagation path than the noise energy propagating through the portions of the fan inlet 38 and the air passage system 34 located between the inlet and the outlet portions of each of the tubes of the array of tubes 1. As previously discussed, the portions of the fan inlet 38 and the air passage system 34 between the inlet and the outlet portions of each of the tubes are equivalent to the shorter second pipe 12 of FIG. 1. At some point in time, the sound energy propagating through each of the tubes of the array of tubes 1 recombines with the sound propagating in the portions of the fan inlet 38 and the air passage system 34 located between the inlet and the outlet portions of each of the tubes. In these instances, the noise energy exiting the outlet of each of the tubes 1 is in an out-of-phase relation and of similar magnitude to the component of sound energy propagating solely through the portions of the fan inlet 38 and the air passage system 34 between the inlet and the outlet portions of each of the tubes. In addition, the noise energy exiting the outlet of each of the tubes has the same variation as the energy propagating in the portions of the fan inlet 38 and the air passage system 34 located between the inlet and the outlet portions of each of the tubes. This out-of-phase recombination of the noise energy reduces the noise levels generated from the turbofan engine (or other noise generating system).

As previously discussed with reference to FIG. 1, by adjusting the length of the tubes 1, or other parameters, such as, for example, cross-sectional area, impedance, internal flow, temperature, etc., the sound can be re-introduced into the fan inlet 38 in an out-of-phase relation from the sound propagating inside the fan inlet 38 and the air passage system 34 in order to cancel the sound in the shorter second pipe 12 throughout a range of frequencies as the engine operational condition changes. This can be done by actively controlling the parameters of the tubes, via a control system 41, in response to varying engine operational (e.g., engine speed, angle of attack, etc.) or environmental (e.g., altitude, temperature, etc) conditions. In a preferred embodiment, an array of microphones 43 can be positioned on the inlet 38, the air passage 34, and/or on the aircraft fuselage 43 (not shown) to monitor the acoustic energy generated by the fan 36. The signals from the microphones are input into a control algorithm 44 that adjust the properties of each of the tubes 1 to minimize the noise energy radiated from the inlet 38 and outlet 30.

Figure 4A:
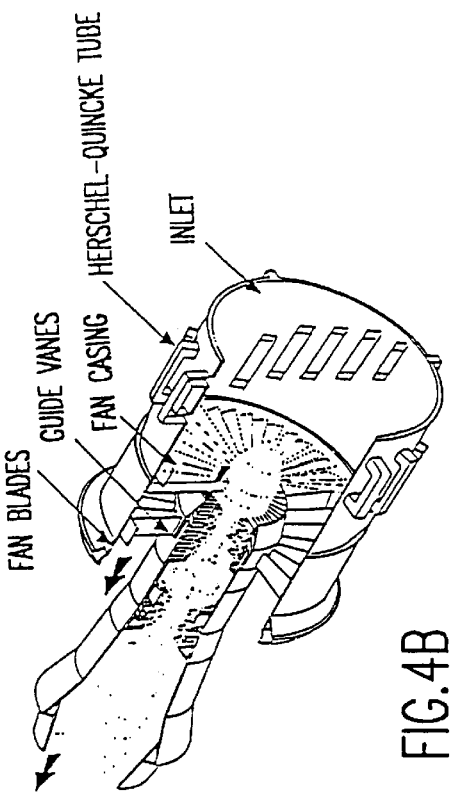
FIG. 4a shows the Herschel-Quincke tubes applied to the inlet of a turbofan engine in a circumferential pattern.
Figure 4B:
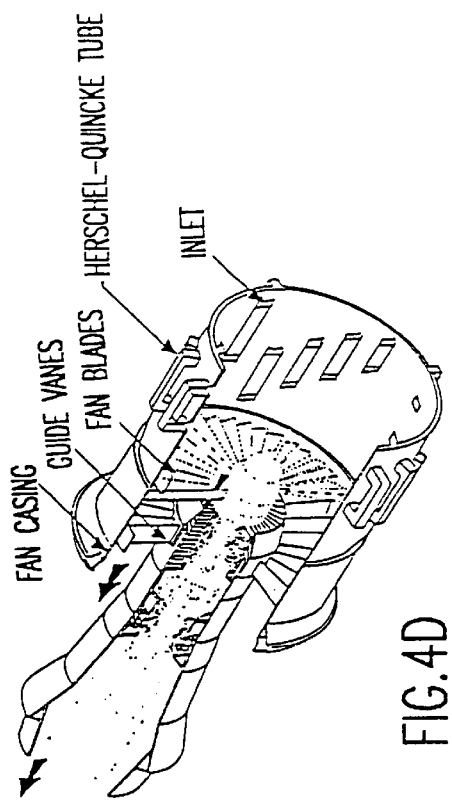
FIG. 4b shows the Herschel-Quincke tubes applied to the inlet of a turbofan engine in a helical pattern.
Figure 4C:
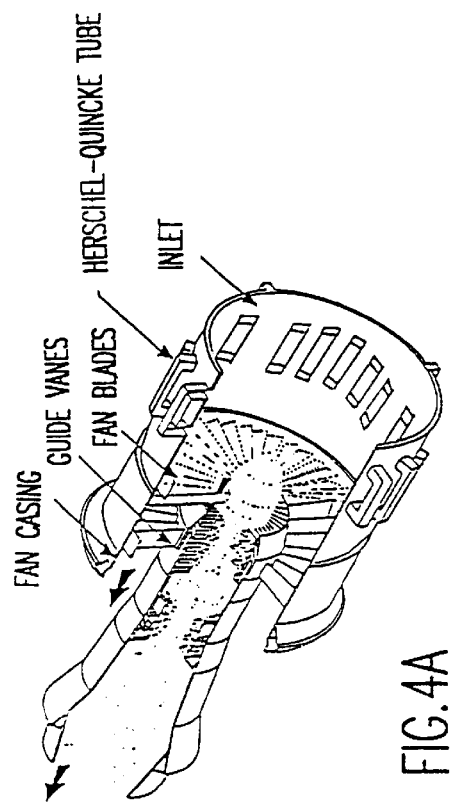
FIG. 4c show the Herschel-Quincke tubes applied to the inlet of a turbofan engine in a circumferential pattern with the tubes at an angle with respect to the engine axis.
Figure 4D:
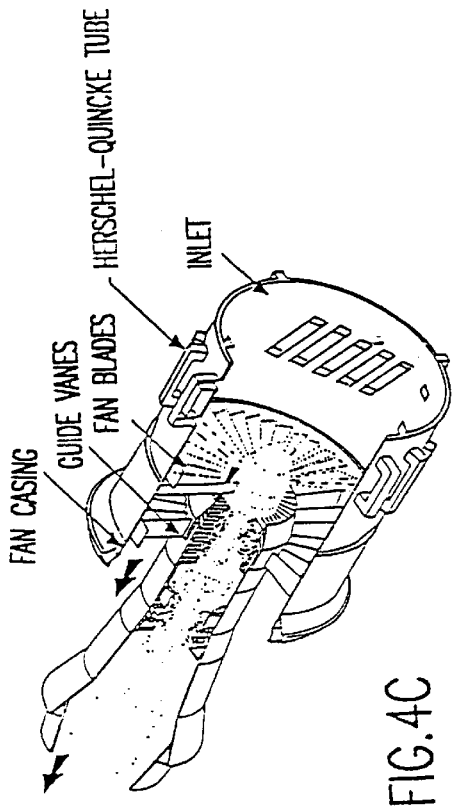
FIG. 4d shows the Herschel-Quincke tubes applied to the inlet of a turbofan engine in a helical pattern with the tubes at an angle with respect to the engine axis.

The concept of the present invention is further illustrated in FIGS. 4a–4d, where a single array of tubes 1 is positioned on the engine inlet in order provide attenuation of sound traveling down a duct at a number of frequencies, which are dictated by each tube parameter, such as length, area, and so forth. In the embodiments of FIGS. 4a–4d, the tubes are aligned in a single array at different locations and alignments, and are separated and independent from one another. For example, FIG. 4a shows the array of tubes applied to the inlet of the turbofan engine in a circumferential pattern and FIG. 4b shows the array of tubes in a helical pattern. FIG. 4c shows the array of tubes applied to the inlet of the turbofan engine in a circumferential pattern with the array of tubes at an angle with respect to the engine axis and FIG. 4d shows the array of tubes in a helical pattern with the array of tubes at an angle with respect to the engine axis. It is well understood by one of ordinary skill in the art that other array of tubes arrangements are contemplated for use by the present invention, such as, for example, about either the fan inlet or the fan outlet in a single row, or in various axial alignments.

Several tests were performed on a turbofan JT15D engine using the noise reduction system of the present invention. These tests were performed in order to determine the efficacy of the noise reduction system of the present invention on a complex noise generating system, such as the turbofan engine where the noise filed varies around the circumference of the engine compartment.

In one experiment, twelve tubes were mounted on the engine inlet. The tubes had a diameter of approximately 3 inches and a length of $L_1$=8.25 inches. The effective length $L_2$ of the shorter second pipe was 5.1 inches. The sound field at 19 far-field microphones was measured. This test was not designed to cancel any particular frequency, such as the blade passage frequency (BPF), but was designed to provide a general overview of the exceptional results produced by the noise reduction system of the present invention.

Figure 5:
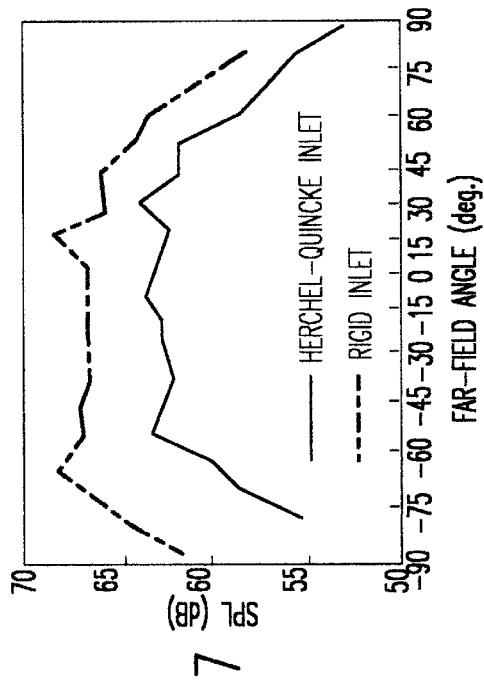
FIG. 5 shows a graph of the preliminary results for the Spectrum Far-field Microphone at 50°.
Figure 6:
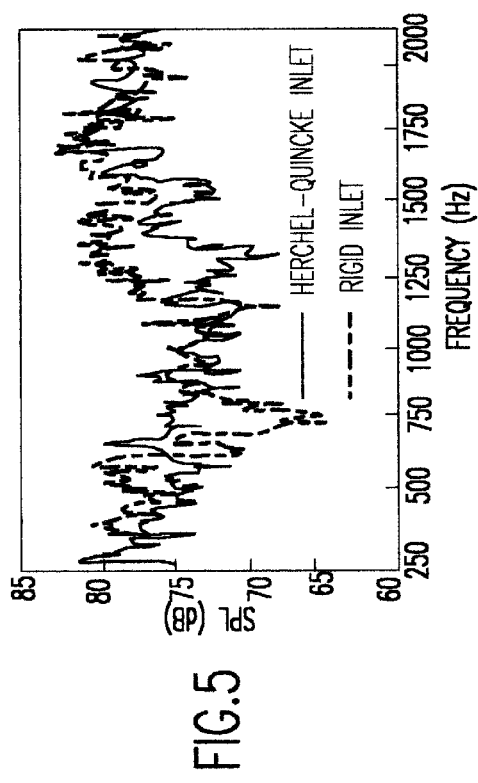
FIG. 6 shows a graph of the preliminary results for the pressure level reduction at 50°.

Referring now to FIG. 5, a spectra from a microphone located 50 degrees off the engine axis at a distance from the engine of 1.8 m, for both the rigid-walled inlet and the inlet with the Herschel-Quincke tubes installed (hereinafter referred to as the "HQ Inlet") is shown. The spectra of reduction obtained with the HQ Inlet, which is computed from the difference between the two curves in FIG. 5, are plotted in FIG. 6. The regions of most noise reduction occur in the vicinity of 716 Hz and 1260 Hz, where reductions of 10 dB are obtained. It is clear from FIGS. 5 and 6 that the tubes achieve reduction over a wide range of frequencies.

Figure 7:
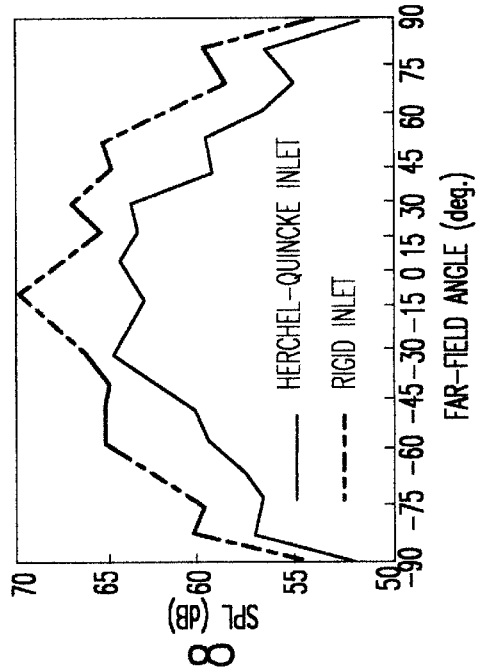
FIG. 7 shows a graph of the preliminary results for the radiation directivity at the 630 Hz ⅓ octive band.

FIG. 7 shows that reductions ranging from 4–6 dB are obtained over all angles in the directivity field in the 630 Hz $V_3$ octave band. Specifically, the acoustic radiation directivity in the horizontal plane passing through the engine axis was measured over ten degree increments with nineteen microphones located at a distance of 1.8 meters from the engine inlet opening. The acoustic radiation in the standard ⅓ octave bands was computed, and the acoustic directivities for the noise in the ⅓ octave band with a center frequency of 630 Hz for both the rigid walled inlet and the HQ Inlet are shown in FIG. 7.

Figure 8:
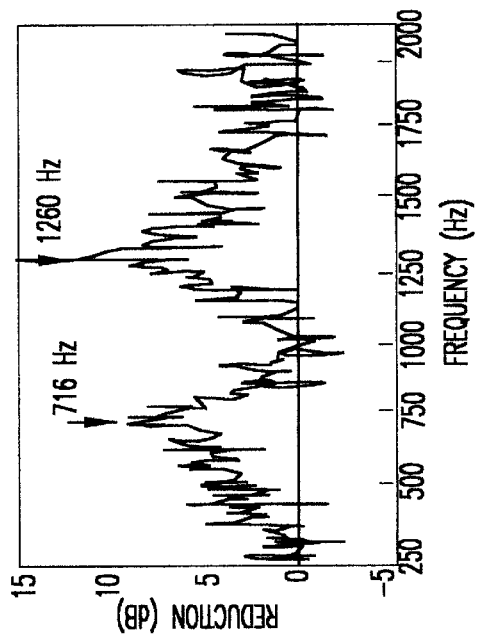
FIG. 8 shows a graph of the radiation directivity at the 1250 Hz ⅓ octive band.

FIG. 8 shows the acoustic directivity with and without the HQ Inlet in the 1250 Hz ⅓ octave band. FIG. 8 further shows reductions ranging from 2 to 7 dB over all angles in the directivity field.

Thus it is clear from the experimental results on an actual operating turbofan engine that considerable noise reduction is obtained using an array of Herschel-Quincke tubes on a turbofan engine inlet. The noise reduction obtained with the tubes occurs over a wide range of frequencies and is spatially global.

Figure 9:
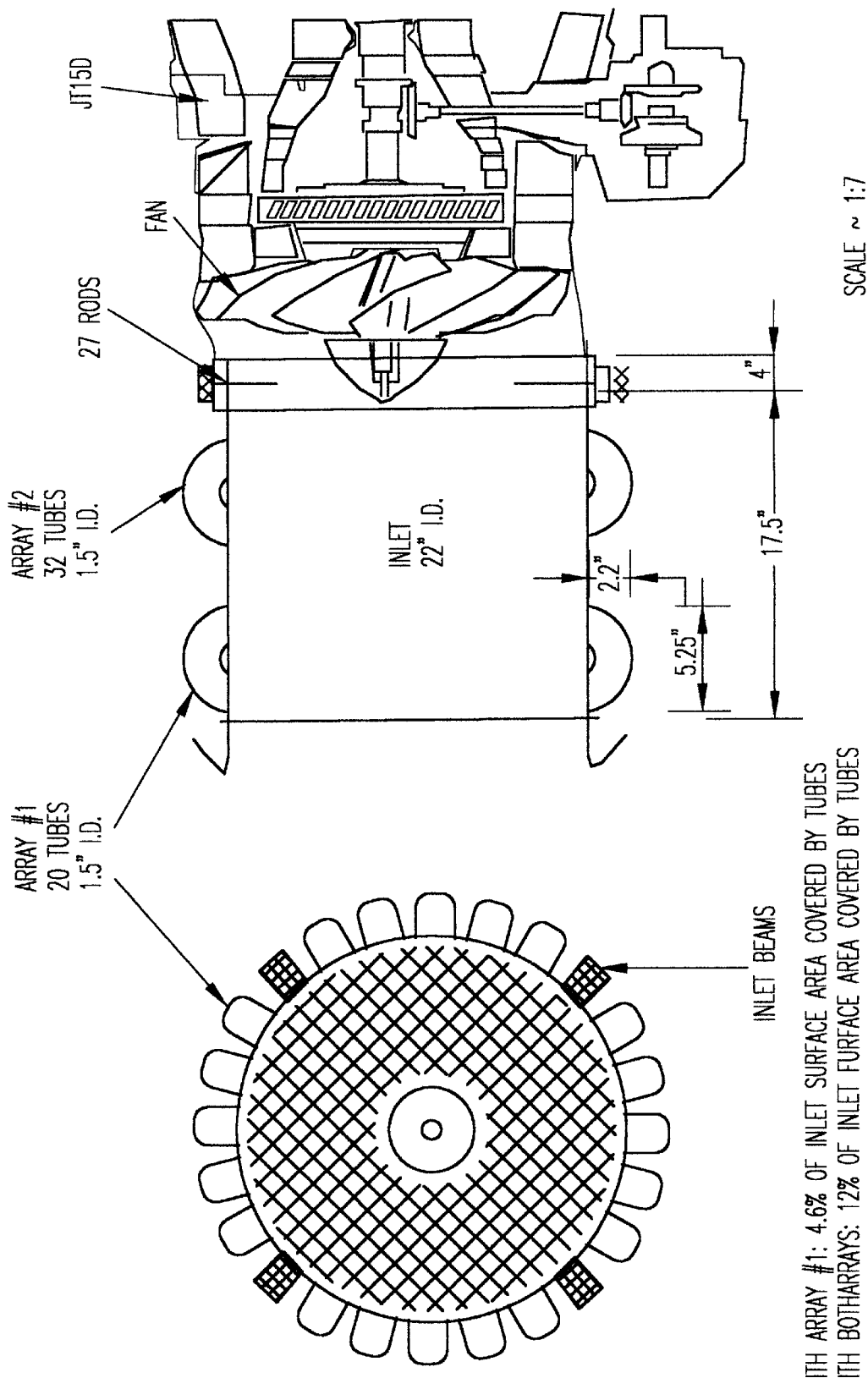
FIG. 9 shows a schematic of two arrays of Herschel-Quincke tubes on a JT15D engine designed for control of broadband noise and the blade passage frequency (BPF) tone.

FIG. 9 shows a schematic of an engine and an array of tubes used for another experiment conducted on the JT15D turbofan engine. This experiment further demonstrates the noise reduction capabilities of an array of Herschel-Quincke tubes in order to attenuate both the tonal and broadband noise content radiated from the turbofan engine. As seen in FIG. 9, an array of 20 tubes were designed so that the second attenuation frequency would be near the BPF tone of the engine at idle speed, i.e., approximately 2320 Hz, and were installed on the JT15D engine inlet. The tubes for these tests were 1.5 inches in diameter and had an effective length of $L_1$=11.1 cm. The distance $L_2$ was 3.6 inches. The tubes in each array were spaced equally about the circumference of the inlet, and the array of 20 tubes took up less than 5% of the total area of the inlet, and both arrays together took up less than 12%. The engine was run at several different speeds, resulting in test cases for the BPF ranging from approximately 2260 to 2520 Hz.

Figure 10:
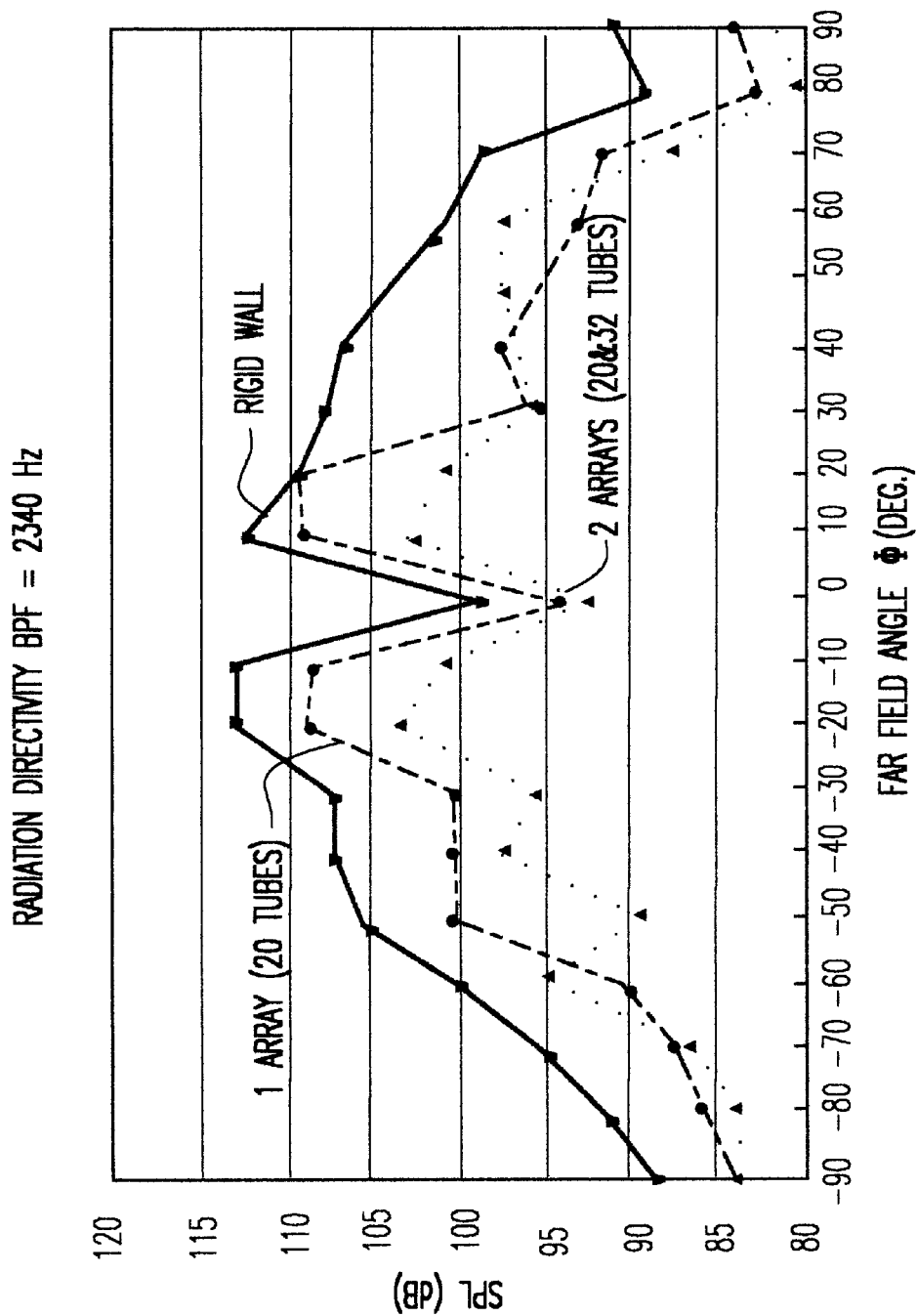
FIG. 10 shows a graph of the sound pressure level (SPL) directivity of the JT15D engine at the BPF tone of 2340 Hz without tubes, and with one and two arrays of Herschel-Quincke tubes.

The results in terms of the radiation directivity of the BPF tone at 2340 Hz are shown in FIG. 10 for both the rigid-walled inlet (no tubes), the inlet with a single array of 20 tubes, and for the inlet configured with two arrays of tubes (one with 20 tubes and the other with 32 tubes). Significant reductions were obtained with both configurations over the entire directivity field. A reduction of the BPF tone in some directions of over 12 dB was achieved. At this BPF, the double array of tubes was seen to result in significant additional reduction towards the front of the engine, i.e., over the sector from 0 to 30 degrees. These particular cases resulted in a total power reduction at the BPF tone of 5.0 dB with the single array and 9.3 dB with the double-array configuration.

Figure 11:
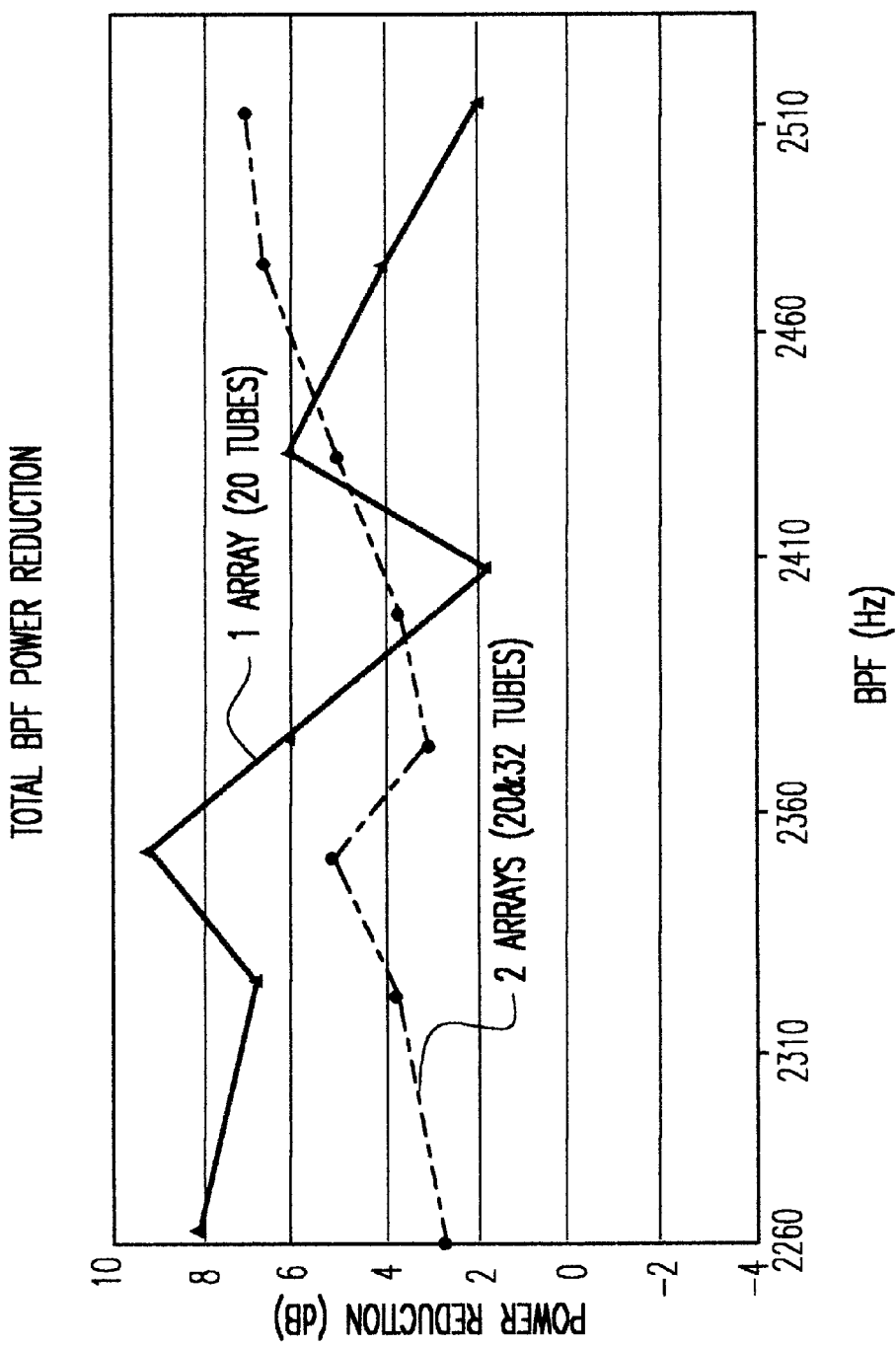
FIG. 11 shows a graph of the total sound power level reduction of the BPF tone vs. BPF for one and two arrays of Herschel-Quincke tubes on the JT15D engine.

The array of tubes were effective over a wide range of the BPF as demonstrated in FIG. 11, which shows the total BPF power reduction for the single and double array configurations. The double-array configuration shows significant improvement in the power reduction of the BPF especially at the lower frequencies on the range tested, i.e., below approximately 2400 Hz. It is clear that although the array of tubes are very effective over the entire range of the BPF, there is an optimal BPF at which the best attenuation occurs.

Figure 12:
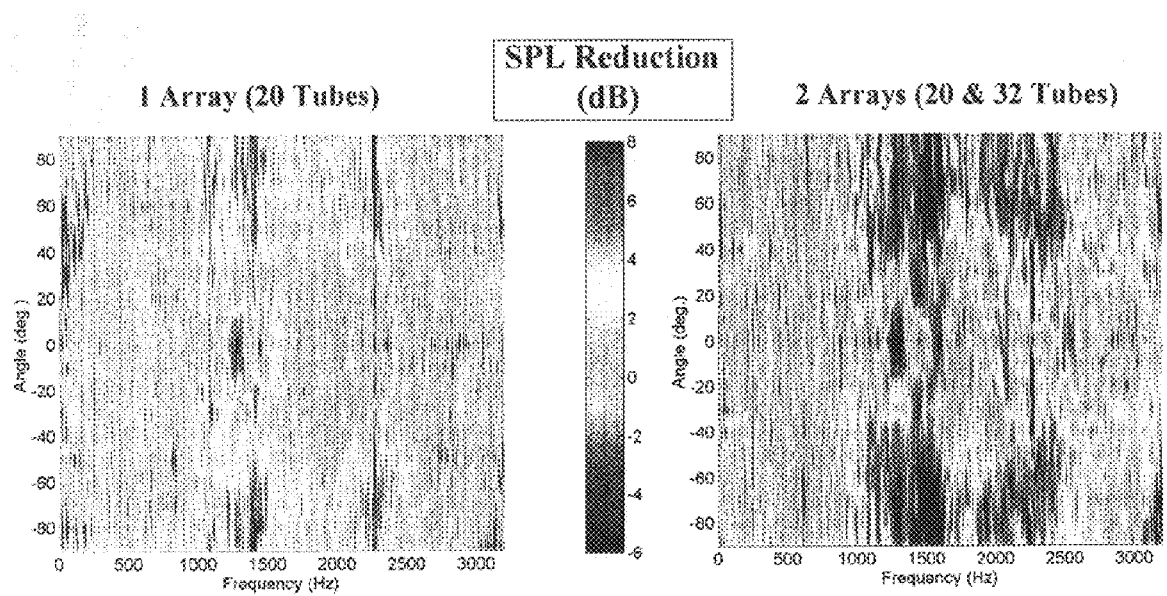
FIG. 12 shows a graph of the SPL reduction versus angle and frequency showing the broadband reduction obtained with one and two arrays of Herschel-Quincke tubes on the JT15D engine.
Figure 13:
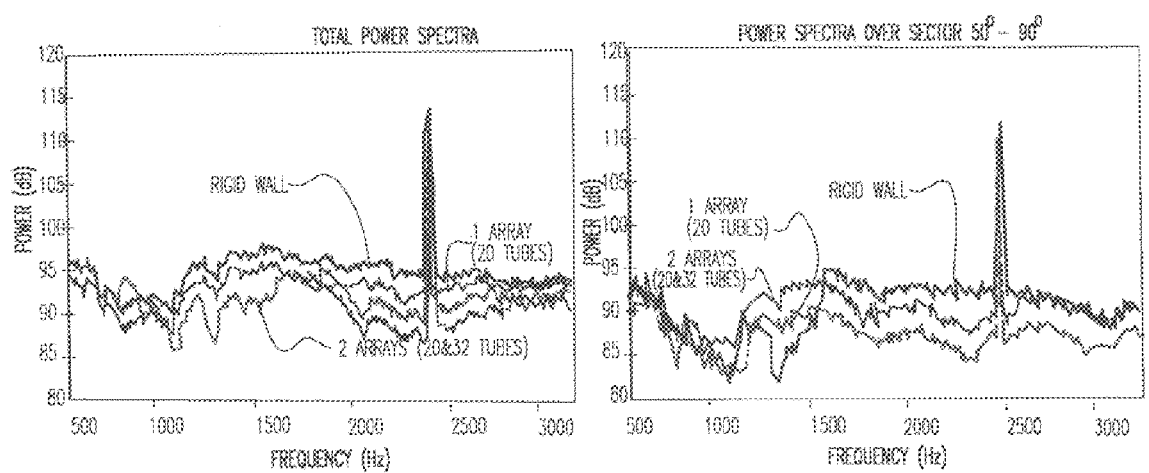
FIG. 13 shows a graph of the total acoustic power spectrum without tubes and with one and two arrays of Herschel-Quincke tubes on the JT15D engine.

The array of tubes were also very effective in attenuating the broadband inlet noise in the frequency ranges near the first and second resonances of the tubes. Specifically, FIGS. 12(a) and 12(b) show the SPL reduction vs. horizontal radiation angle and frequency for single and double array configurations, respectively. The highest levels of broadband reduction occurred in the vicinity of the first and second resonances of the tube, i.e., approximately 1200 and 2400 Hz, respectively. Note that typical inlet liners would not be able to achieve the level of broadband attenuation (5 to 8 dB) at these low frequencies, particularly at 1200 Hz. The total broadband power spectra and the broadband power spectra over the sector from 50 degrees to 90 degrees for the rigid-walled inlet and the inlets configured with the single and double array of tubes are shown in FIGS. 13(a) and 13(b) respectively. The reduction of the broadband content when combined with the reduction obtained at the BPF tone has a considerable impact in the overall total sound power reduction above 1000 Hz, which was determined to be 2.8 dB and 5.1 dB for the single array configuration and the double-array configuration, respectively. These results clearly demonstrate the potential of this novel approach for the reduction of tonal and broadband fan noise.

It is noted that all tests using the noise reduction system of the present invention were performed using fixed tubes. However, the test results would be equally exceptional and possibly increased over a wider range of BPF tones if the tubes were actively controlled (e.g., manipulated) by a control system, as described with reference to FIG. 3. Thus, the present invention not only contemplates the use of fixed tubes, but equally contemplates the use of tubes actively controlled to dynamically adjust the parameters of the tubes in response to specific frequencies generated by the particular noise generating system used with the present invention.

While the invention has been described in terms of its preferred embodiments, those skilled in the art will recognize that the invention can be practiced with modification within the spirit and scope of the appended claims.

We claim:

1. A noise reduction system comprising:

means for generating non-uniform noise energy about an inner surface and within an enclosure having at least an inlet;

at least one array of tubes each having an inlet and an outlet, the inlet and the outlet of each tube of the at least one array of tubes communicating with apertures in the enclosure and the at least one array of tubes being positioned about an outer surface of the enclosure, portions of the enclosure having an effective length $L_2$ between the inlet and the outlet of each of the tubes and the tubes having a length $L_1$, where $L_1 > L_2$, wherein said non-uniform noise energy divides into two components at the inlet of each of the tubes of the at least one array of tubes, a first component of the non-uniform noise energy propagates through each of the tubes over the length $L_1$ and a second component of the non-uniform noise energy propagates through the enclosure over the effective length $L_2$ such that when the non-uniform noise energy exits the outlet of each of the tubes, the non-uniform noise energy is out-of-phase and recombines with the non-uniform noise energy propagating over the effective length $L_2$ thus reducing the noise levels generated from the means for generating noise energy.

2. The noise reduction system of claim 1, wherein the enclosure has an outlet.

3. The noise reduction system of claim 2, wherein the array of tubes is positioned proximate to one of the inlet and outlet of the enclosure.

4. The noise reduction system of claim 1, wherein the enclosure is substantially tube shaped and the at least one array of tubes is positioned in a circumferential array about the enclosure.

5. The noise reduction system of claim 1, wherein:

the means for generating noise is a turbofan engine and the enclosure is an engine compartment housing the engine, the engine compartment includes a fan inlet, a fan outlet and an air passageway between the fan inlet and the fan outlet, and the turbofan engine including a fan located proximate to the fan inlet, and portions of the fan inlet, the fan outlet and the air passageway between the inlet and the outlet of each of the tubes have the effective length $L_2$.

6. The noise reduction system of claim 5, wherein:

the fan generates noise energy which propagates toward the fan inlet, and the at least one array of tubes are circumferentially positioned at the fan inlet in order to reduce the noise levels generated from the fan.

7. The noise reduction system of claim 5, wherein:

the fan generates noise energy which propagates toward the fan outlet, and the at least one array of tubes are circumferentially positioned at least at one of the fan outlet and the air passage in order to reduce the noise levels generated from the fan.

8. The noise reduction system of claim 5, wherein the engine compartment includes a passive liner treatment and the at least one array of tubes are embedded in the passive liner treatment.

9. The noise reduction system of claim 5, wherein the noise energy propagating through each tube of the at least one array of tubes has a longer propagation path than the noise energy propagating through portions of the fan inlet, the fan outlet and the air passageway between the inlet and the outlet of each of the tubes.

10. The noise reduction system of claim 5, wherein each tube is oriented along a longitudinal direction of the engine.

11. The noise reduction system of claim 5, wherein each tube is oriented at an angle with respect to an engine axis such that a re-entrance point of each of the tubes is at a different angle upstream in the inlet than which it originated.

12. The noise reduction system of claim 5, wherein each tube of the at least one array of tubes is positioned at various axial locations with respect to an engine axis.

13. The noise reduction system of claim 12, wherein the at least one array of tubes is positioned in a helical configuration.

14. The noise reduction system of claim 1, wherein each tube of the at least one array of tubes is oriented along a longitudinal direction of the means for generating noise.

15. The noise reduction system of claim 1, each tube of the at least one array of tubes is oriented at an angle with respect to an axis of the means for generating noise such that a re-entrance point of each of the tubes is at a different angle upstream in the inlet than which it originated.

16. The noise reduction system of claim 1, wherein each tube of the at least one array of tubes is positioned at various axial positions with respect to an axis of the means for generating noise.

17. The noise reduction system of claim 16, wherein the at least one array of tubes is positioned in a helical configuration.

18. The noise reduction system of claim 1, wherein dimensions of each of the tubes of the at least one array of tubes are dynamically adapted to eliminate certain noise energy frequencies generated by the means for generating noise energy.

19. The noise reduction system of claim 1, wherein each of the tubes of the at least one array of tubes are at least one of identical and independent with respect to each other.

20. The noise reduction system of claim 1, wherein reducing the noise levels reduces noise frequencies for both tonal and broadband noise components.

21. The noise reduction system of claim 1, wherein each of the tubes of the at least one array of tubes have a cross section area of $A_1$ and the enclosure between the inlet and outlet of each tube has a cross section area of $A_2$.

22. The noise reduction system of claim 21, wherein $A_1<A_2$.

23. The noise reduction system of claim 21, wherein each of the tubes of the at least one array of tubes have a varying cross section area between the inlet and the outlet.

24. The noise reduction system of claim 21, wherein the cross section area of $A_2$ is not uniform.

25. The noise reduction system of claim 1, wherein the at least one of array of tubes comprises a second array of tubes which communicate with the apertures in the enclosure and are positioned about the outer surface of the enclosure at a distance from the at least one array of tubes.

* * * * *